US011290357B2

(12) United States Patent
Chan et al.

(10) Patent No.: US 11,290,357 B2
(45) Date of Patent: Mar. 29, 2022

(54) AUTOMATED DOCUMENT SUMMARIES USING HIGHLIGHTING

(71) Applicant: ServiceNow, Inc., Santa Clara, CA (US)

(72) Inventors: Victor Chung-Wai Chan, Saratoga, CA (US); Ryan Christopher Currier, Dublin, CA (US); Harish Kumar Balachandra Bellamane, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/566,581

(22) Filed: Sep. 10, 2019

(65) Prior Publication Data

US 2021/0075704 A1    Mar. 11, 2021

(51) Int. Cl.
| | |
|---|---|
| *G06F 15/16* | (2006.01) |
| *H04L 43/065* | (2022.01) |
| *G06F 11/34* | (2006.01) |
| *H04L 43/045* | (2022.01) |
| *H04L 43/022* | (2022.01) |

(52) U.S. Cl.
CPC ........ *H04L 43/065* (2013.01); *G06F 11/3476* (2013.01); *H04L 43/022* (2013.01); *H04L 43/045* (2013.01)

(58) Field of Classification Search
CPC ... H04L 43/065; H04L 43/022; H04L 43/045; G06F 11/3476
See application file for complete search history.

(56) References Cited

U.S. PATENT DOCUMENTS

| | | | |
|---|---|---|---|
| 6,609,122 B1 | 8/2003 | Ensor |
| 6,678,887 B1 | 1/2004 | Hallman |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |

(Continued)

*Primary Examiner* — John B Walsh
(74) *Attorney, Agent, or Firm* — Fletcher Yoder PC

(57) ABSTRACT

A computer-implemented method is provided that includes receiving, from a first client device associated with a managed network, a request for a record from a plurality of records that relate to the managed network. A depiction of a first graphical user interface that visually represents part of the record is sent to the first device and a representation of a selected portion of the record, that includes text from the part of the record that was visually represented, is received from the first device. A request for the summary of the record is then received from a second client device associated with the managed network and a depiction of a second graphical user interface that visually represents the summary of the record is transmitted to the second device. The depiction of the second graphical user interface is representative of at least the selected portion.

20 Claims, 10 Drawing Sheets

(56) References Cited

U.S. PATENT DOCUMENTS

| | | |
|---|---|---|
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 * | 4/2014 | Naik .................. G06F 11/0781 719/318 |
| 8,743,121 B2 | 6/2014 | De Peuter |
| 8,887,133 B2 | 11/2014 | Behnia |
| 8,983,982 B2 | 3/2015 | Rangarajan |
| 9,239,857 B2 | 1/2016 | Trinon |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,792,387 B2 | 10/2017 | George |
| 2002/0198985 A1 * | 12/2002 | Fraenkel ............. H04L 41/5009 709/224 |
| 2009/0100372 A1 * | 4/2009 | Lauridsen ............. G06F 16/958 715/781 |
| 2014/0089406 A1 * | 3/2014 | Gniffke ................ H04L 67/147 709/204 |
| 2020/0176105 A1 * | 6/2020 | Ross ................ G06Q 10/06316 |
| 2020/0265485 A1 * | 8/2020 | Pachauri ............. G06Q 30/016 |

\* cited by examiner

AUTOMATED DOCUMENT SUMMARIES USING HIGHLIGHTING

BACKGROUND

It can be beneficial to provide, in a single location or interface, a collection of information about an ongoing event or incident. For example, a user of a managed network could generate a support ticket, and the contents of the support ticket, any related communications (e.g., emails), server commands, server status messages, or other information could be provided to a support technician. The information could assist the support technician in determining the current status of the ticket, reviewing previous attempted solutions and their results, determining actions to attempt to resolve the ticket, or taking some other support action.

However, such information can become extensive and difficult to navigate. The large amount of data associated with a particular event or incident could make it difficult for a new technician to take over the case or for a manager to review a technician's ongoing handling of the event or incident. Presenting all of this data on a single screen, especially in cases where that screen is small and/or has low resolution, can be challenging. It is desirable to somehow reduce these large amounts of data to facilitate their display in one location while preserving the most relevant aspects of the data.

SUMMARY

In many situations, an ongoing incident or other event may be associated with a record that contains a history of email or other communications, attempted fixes, results of such attempted fixes, incident status reports, or other information related to the ongoing incident. For example, an incident report, problem ticket, or other ongoing event related to a managed network could be associated with a record that includes the initial problem ticket, email or other communications between a technician and user, actions taken by the technician, the results of such actions, changes in the status of the problem ticket, notes taken by the technician regarding their attempt to resolve the problem ticket, or other information.

Such information could be extensive, due to the ongoing incident having a long history. Accordingly, it can be difficult and time-intensive to review the record for portions that are relevant to resolving the incident. Thus, it can be difficult to re-assign a technician to such an incident, for a supervisor to assist the technician and/or to review their performance, or for some other individual to become familiar with the ongoing incident via the record. This problem can be exacerbated in that the information could be largely cumulative, e.g., due to individual email communications being present multiple times in subsequent reply emails. Additionally, some portions of the record that are initially relevant may later become irrelevant as the situation changes or as more information is uncovered.

The embodiments herein address the deficiencies and drawbacks of prior approaches by automating summary generation for records. Notably, this results in users being provided with summaries of manageable size, and that can be displayed on a small and/or low-resolution screen with little or no scrolling. In this fashion, an understanding of the records can be obtained more expeditiously and without having to scroll through potentially many screens of data in the record.

These embodiments may include a variety of graphical user interfaces or other systems in order to facilitate the generation and maintenance of such summary information for records (e.g., records related to events or other ongoing incidents related to the operation or use of a managed network). For example, some or all of a record (e.g., emails, commands, automated system status updates, or other information related to a problem ticket or other ongoing incident) could be provided to a technician or other user (e.g., to a client device associated with the user) via a graphical user interface. The user could then operate the graphical user interface to select one or more portions of the record that are relevant to a problem, its resolution, or other information represented by the record. The selected one or more portions could then be added to a summary for the record. Subsequently, another graphical user interface could be provided (e.g., to the user that selected the one or more portions of the record and/or to some other user) to represent the summary of the record. Such a representation could include the text or other content of the selected portion(s), annotation information provided by the user for the selected portion(s), or some other information related to the selected portions. This summary interface could then be used to update the summary, to navigate to the selected portion(s) of the record, or to provide some other benefit.

Accordingly, a first example embodiment may involve a method including: (i) accessing persistent storage that contains a plurality of records, wherein the plurality of records each have multiple textual fields and relate to a managed network; (ii) receiving, from a first client device associated with the managed network, a request for a record from the plurality of records; (iii) transmitting, to the first client device, a depiction of a first graphical user interface that visually represents part of the record; (iv) receiving, from the first client device and by way of the first graphical user interface, a representation of a selected portion of the record, wherein the selected portion of the record includes text from the part of the record that was visually represented; (v) writing, to the persistent storage, an indication that the selected portion of the record is part of a summary of the record; (vi) receiving, from a second client device associated with the managed network, a request for the summary of the record; and (vii) transmitting, to the second client device, a depiction of a second graphical user interface that visually represents the summary of the record, wherein the depiction of the second graphical user interface is representative of at least the selected portion.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

In a fifth example embodiment, a remote network management platform associated with a managed network may include (i) persistent storage containing a plurality of records, wherein the plurality of records each have multiple textual fields and relate to the managed network; and (ii) one or more processors. The one or more processors may be configured to: (a) receive, from a first client device associated with the managed network, a request for a record from the plurality of records; (b) transmit, to the first client device, a depiction of a first graphical user interface that visually represents part of the record; (c) receive, from the first client device and by way of the first graphical user interface, a representation of a selected portion of the record, wherein the selected portion of the record includes text from the part of the record that was visually represented; (d) write, to the persistent storage, an indication that the selected portion of the record is part of a summary of the record; (e) receive, from a second client device associated with the managed network, a request for the summary of the record; and (f) transmit, to the second client device, a depiction of a second graphical user interface that visually represents the summary of the record, wherein the depiction of the second graphical user interface is representative of at least the selected portion.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
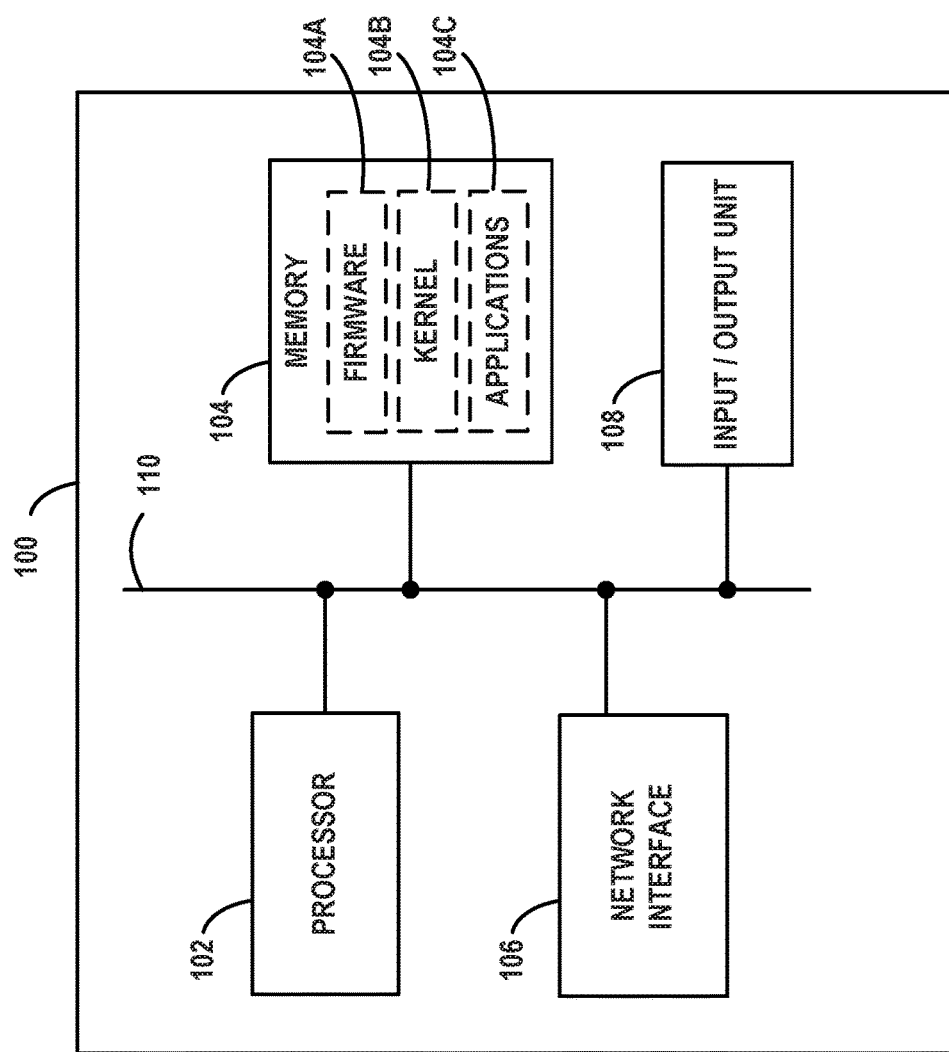
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
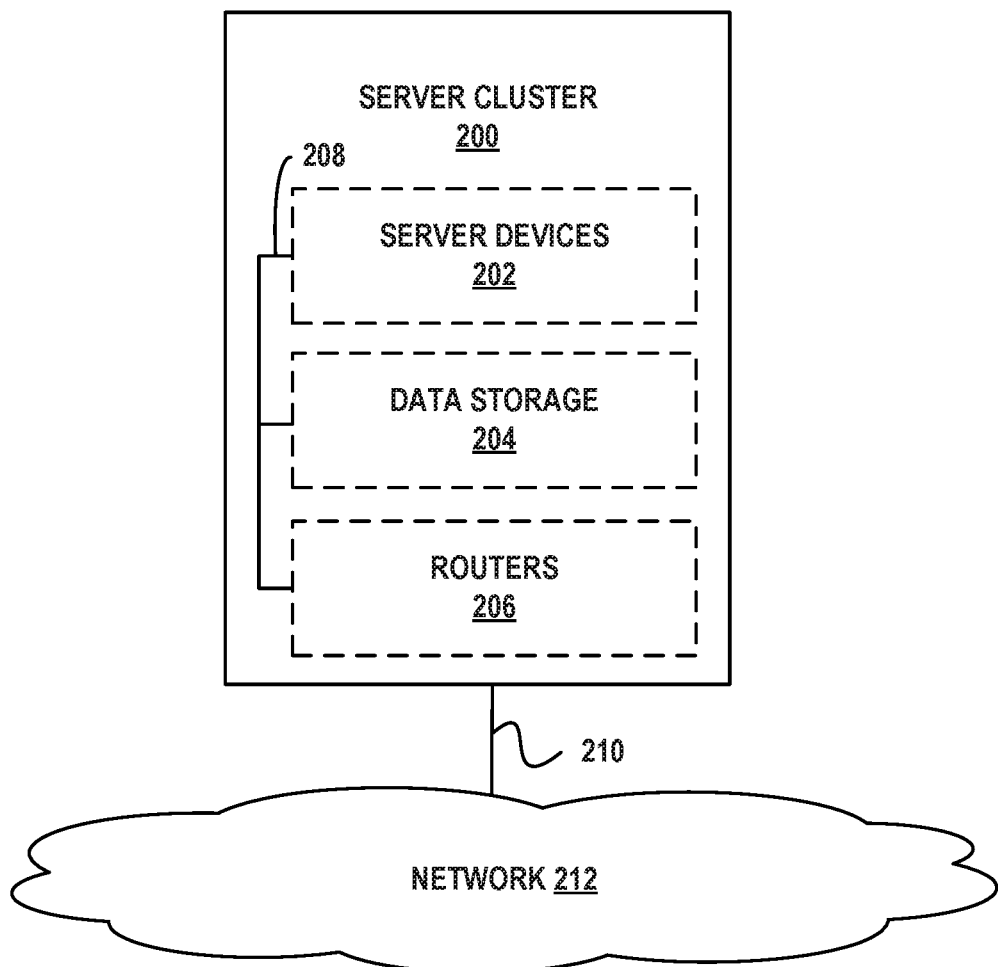
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
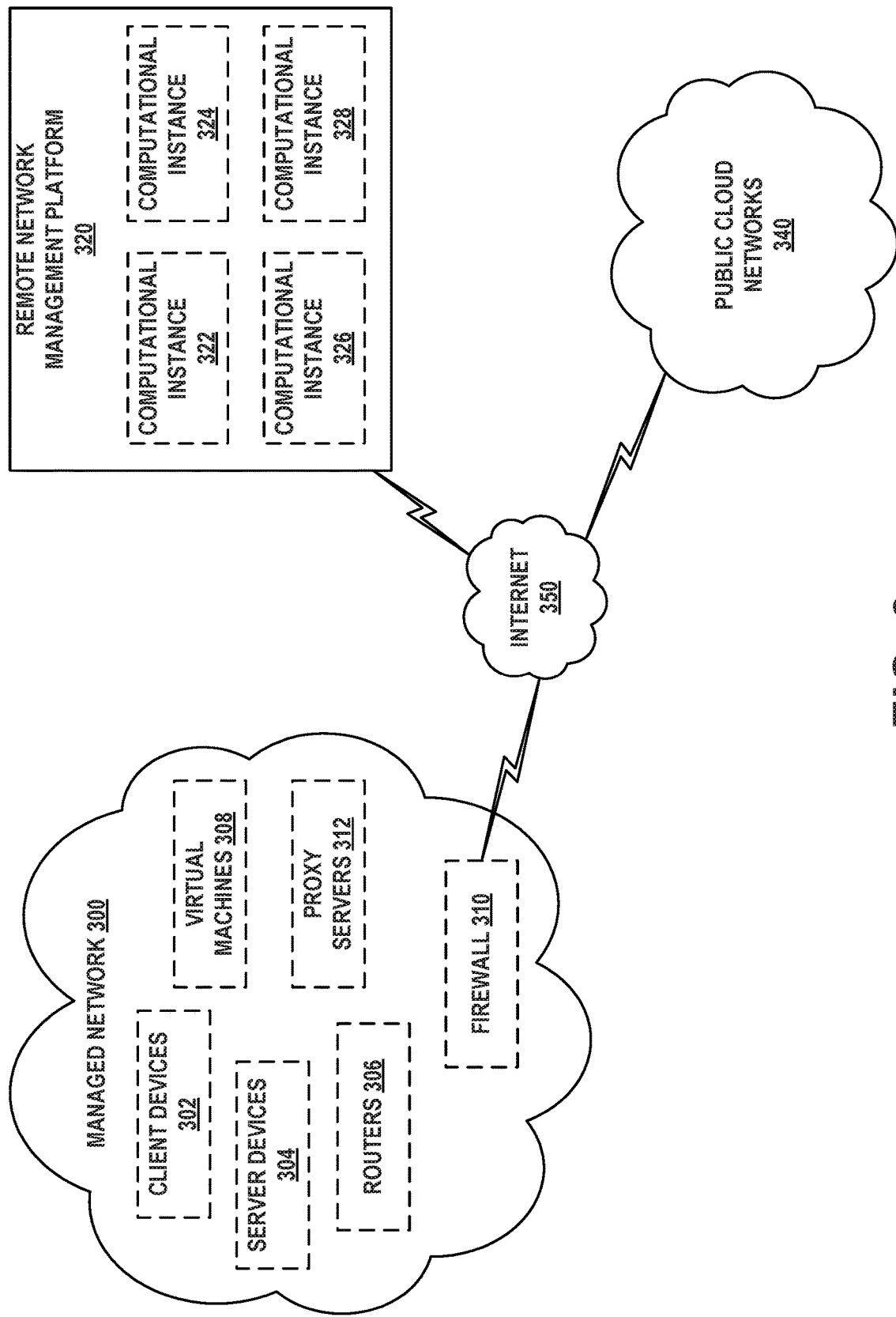
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
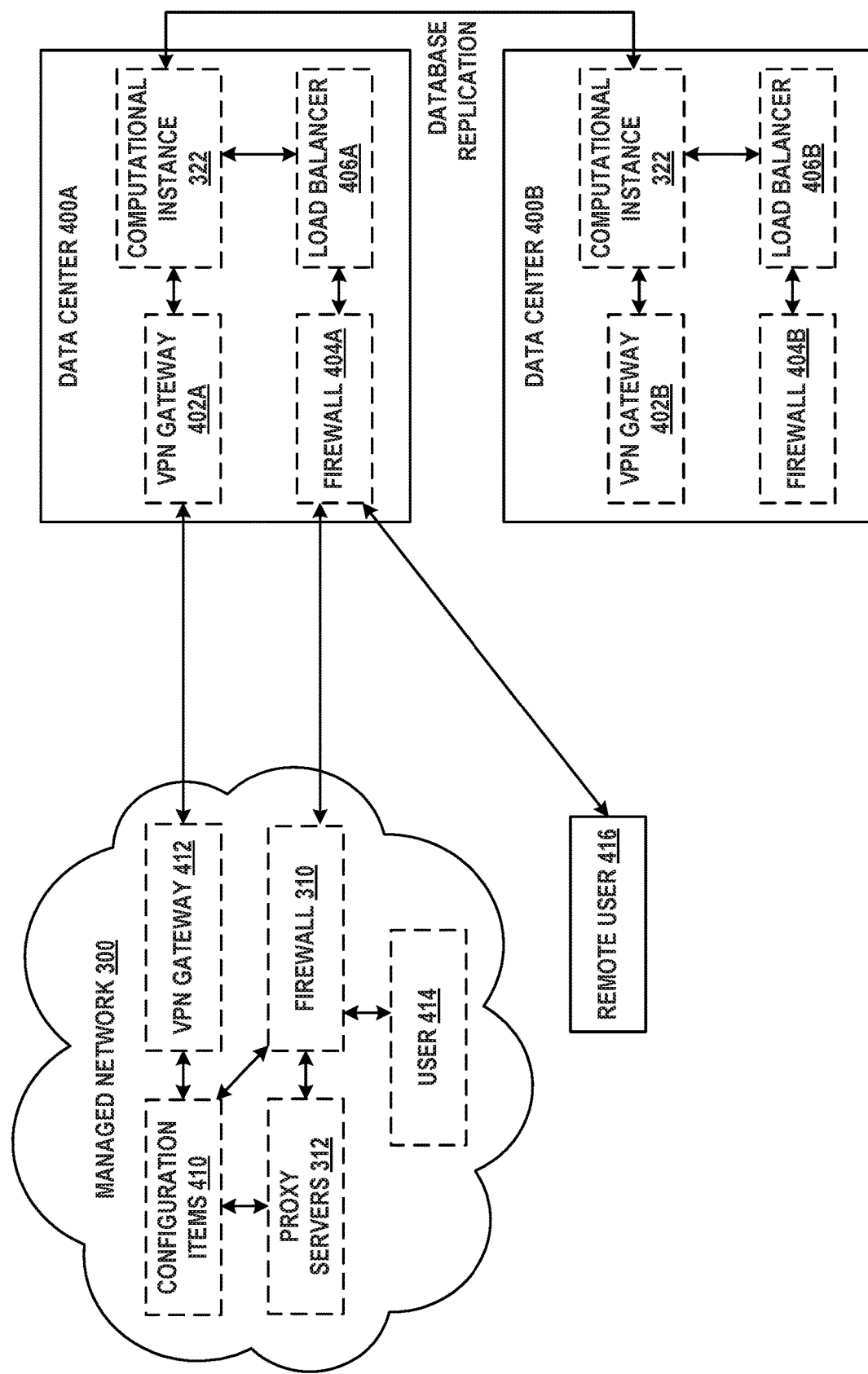
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
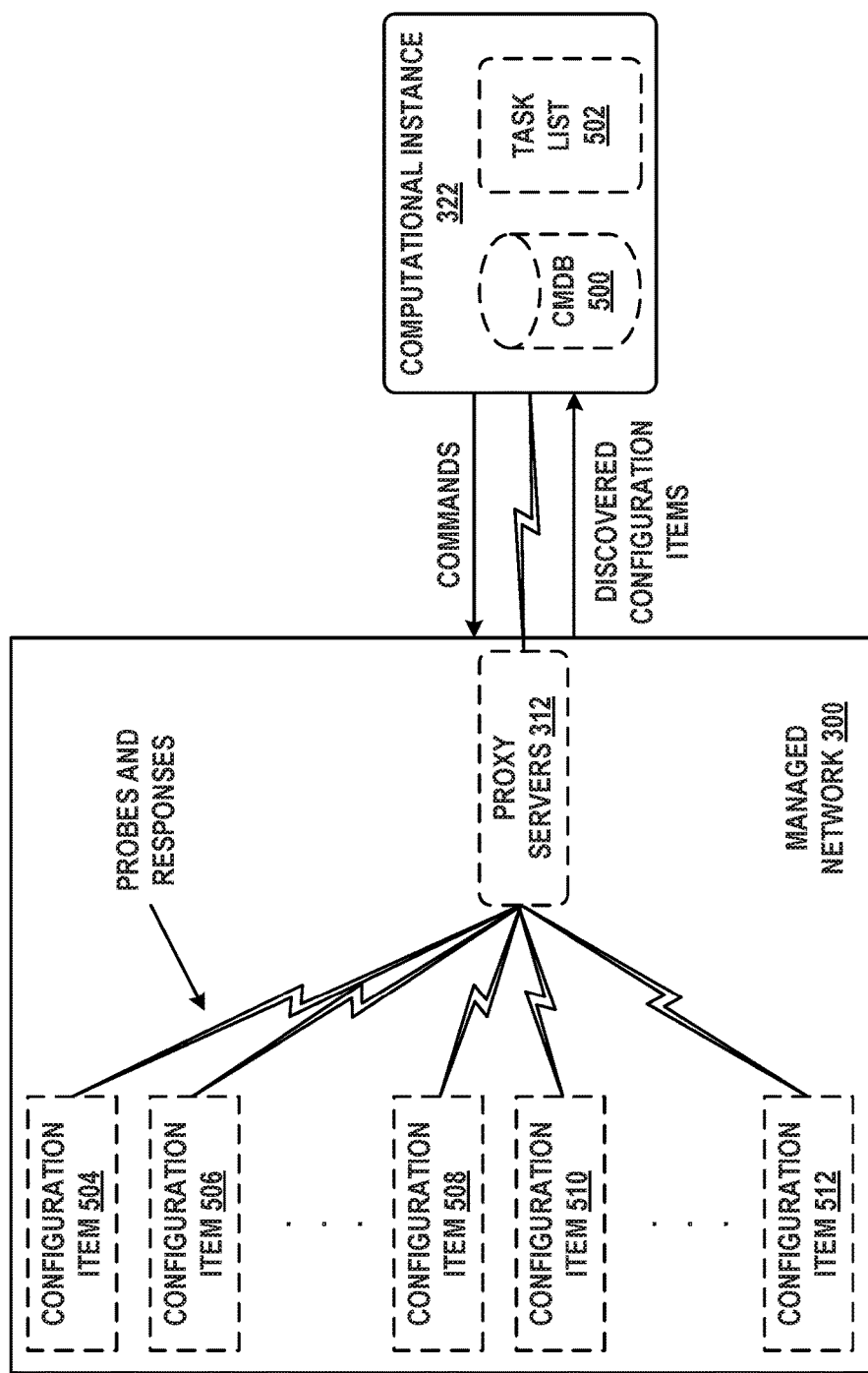
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500.

For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
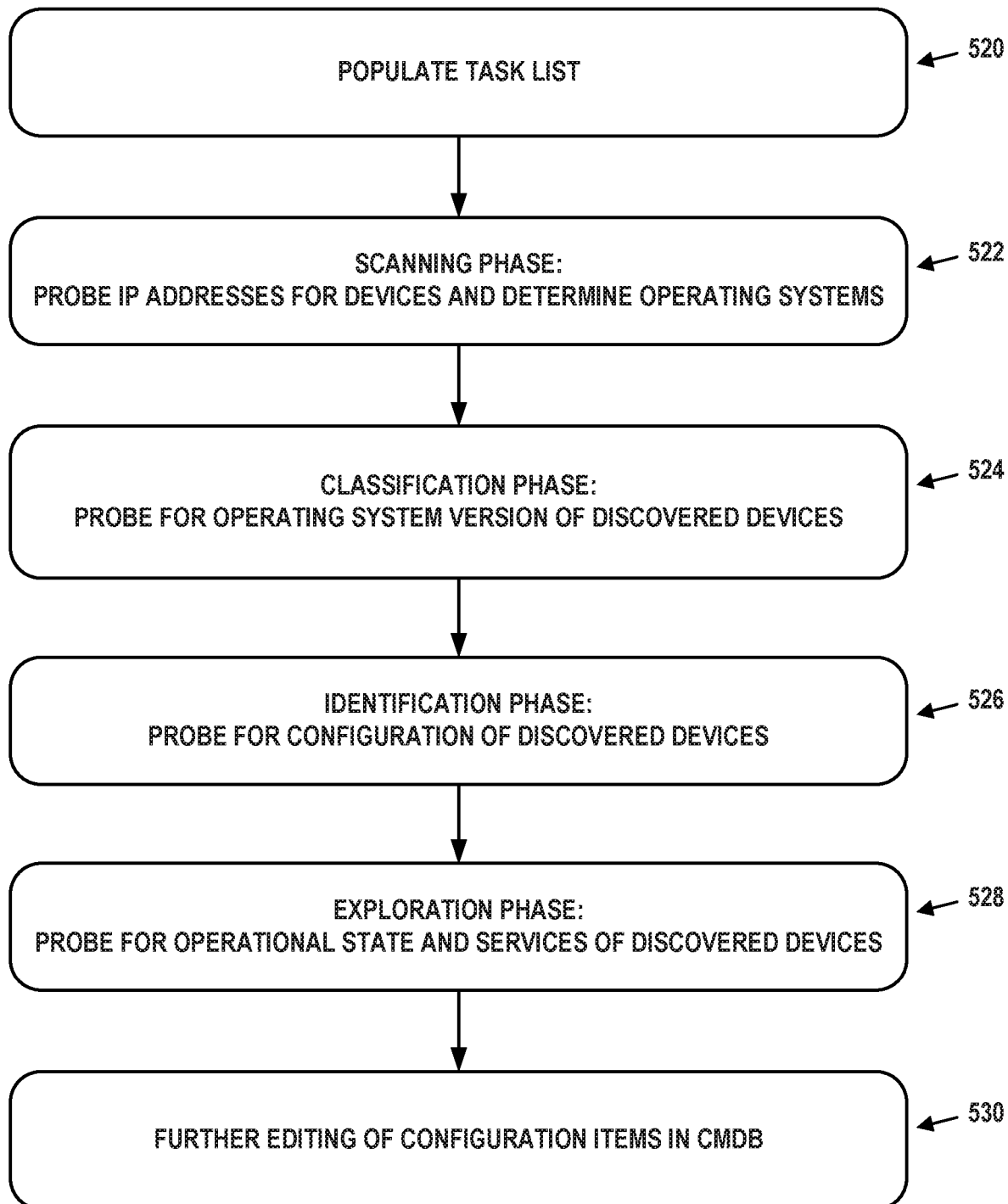
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. EXAMPLE USER INTERFACES AND SUMMARY GENERATION

In many contexts, a large amount of information may be generated and/or collected about a particular event or topic. For example, a record could be made for an ongoing incident related to a problem ticket generated by a user of a managed network environment. Such a record could include one or more problem reports generated by users, communications related to the problem ticket (e.g., emails between a user and a technician assigned to the problem ticket), actions taken to resolve the problem ticket (e.g., server restarts or other commands sent by a technician, software updates or rollbacks, etc.), notes made by a technician assigned to the problem ticket, information about system status before and/ or during the pendency of the problem ticket, or other information. Such information could be used by the technician to refresh their memory about the problem and/or to plan action(s) to resolve the problem ticket, by a replacement and/or supplemental technician to get up to speed on the history of the problem ticket, by a supervisor to assess a technician's performance, or used to provide some other benefit.

Figure 6:
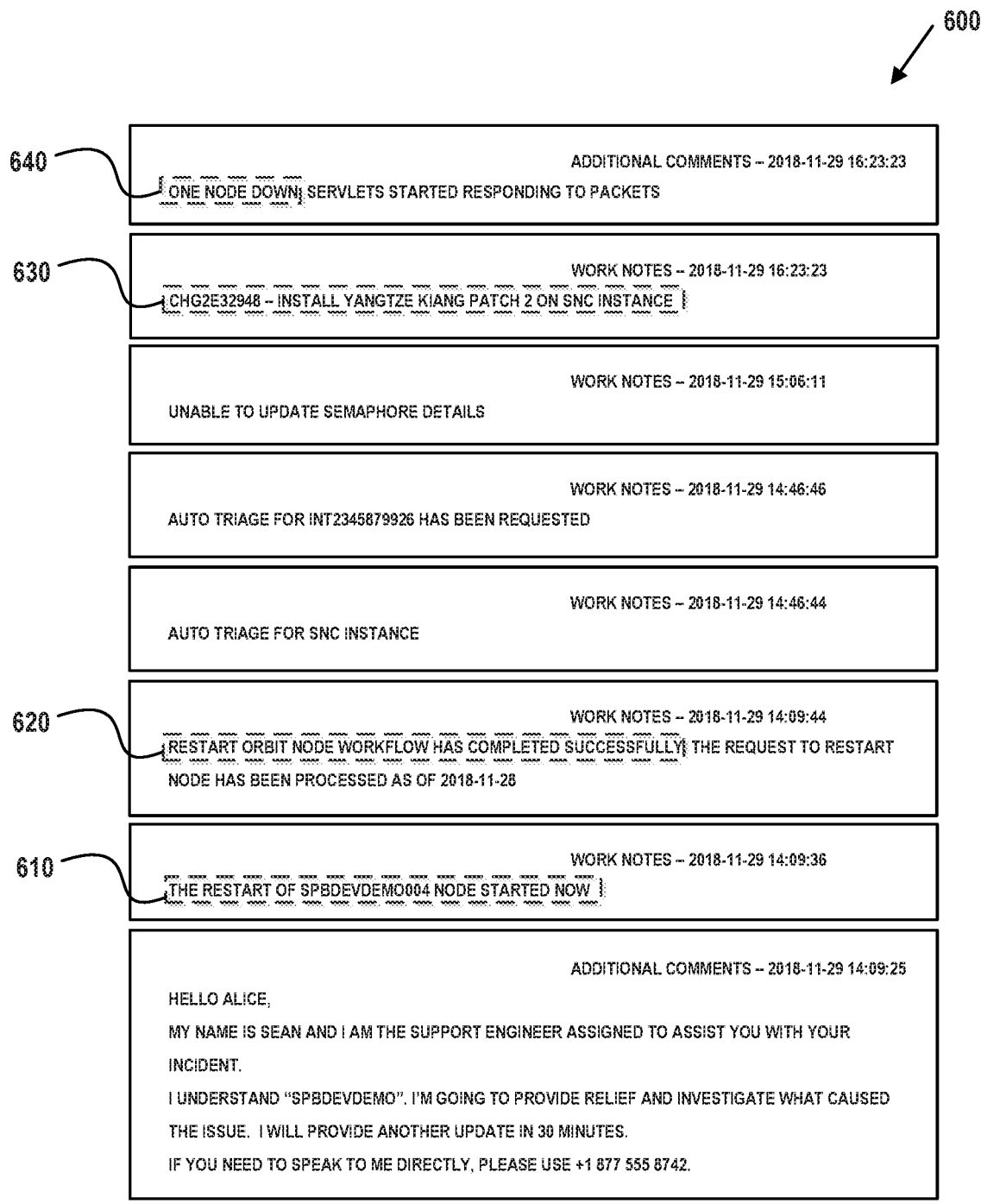
FIG. 6 depicts an example record.

FIG. 6 illustrates a graphical user interface 600 that visually represents a portion of such an example record. The illustrated portion includes communications between a user and a technician ("Hello, Alice, My name is Sean . . . "), actions taken by a technician to resolve a problem ("Install Yangtze Kiang patch 2 . . . "), automatic actions taken by a network management system ("Auto triage for . . . "), and other information. Information depicting the graphical user interface 600 could be provided, by a server of a remote network management platform or by some other system, in response to a request for such information. For example, a technician could operate a laptop or other client device to request the record and/or to request some other information about a problem ticket or other incident that is related to the record.

Such a record can be extensive. For example, an event or other ongoing incident related to the ticket could have been pending for an extended period of time, resulting in many emails, commands, or other related information being added to the record. Additionally, the record could include a great deal of cumulative information or otherwise irrelevant information. For example, where the record includes emails or other communications, portions of such communications could be included multiple times in the body of multiple different emails due to replies, forwards, or other aspects of email formatting. Further, older aspects of the record may become irrelevant, due to being out of date, due to being related to resolved aspects of the problem ticket, due to representing an outdated or otherwise incorrect understanding of the underlying problem, or due to some other factor(s).

Accordingly, it can be difficult to review such a record, e.g., in order for a new technician to become familiar with the history and current status of a problem ticket, to provide a status update for a customer. The systems and methods provided herein could be used to facilitate summary generation for such records. This could reduce the amount of technician time and effort necessary to summarize a record, increase the utility of the summary by providing additional functionality, and result in more up-to-date summaries, among other benefits. Additionally, these systems and methods could facilitate collaboration, allowing one user to highlight important information for other users.

A graphical user interface depicting a record could include functionality to allow a technician or other user to select portion(s) of the record to include in a summary of the record. Indications of the selected portions (e.g., copies of the content of the selected portions, addresses and/or indexes to the portions within the record) could then be recorded to the summary of the record. The selected portions could include whole emails, commands, status updates, or other discrete elements within the record. Additionally or alternatively, the selected portions could include portions within such discrete elements. For example, the selected portions could include sentences, phrases, words, or other selected sections of text within an email. Multiple portions could be selected within a single email or other single discrete element of the record.

The graphical user interface 600 of FIG. 6 represents a record that includes various selected portions 610, 620, 630, 640. The graphical user interface 600 could allow a user to select such portions of the depicted record for addition to the summary of the record. The graphical user interface 600 could allow a user to select portions of the record by highlighting text, images, or other elements within the record. The graphical user interface 600 could include buttons, rely on keyboard commands, or use other means to change a mode of interaction with the graphical user interface 600 such that a user could highlight or otherwise select portions of the record for addition to the summary. Alternative modes of interaction with the graphical user interface 600 could allow the user to highlight or otherwise interact with portions of the record without adding those portions to the summary, e.g., to allow the user to copy text, to open emails or other items associated with elements of the record, or to engage with the contents of the record in some other manner.

The graphical user interface 600 could include buttons, pop-up menus, right-click menus, or other elements to allow discrete elements (e.g., elements associated with emails, commands, or other events within the record) to be added to the summary. The graphical user interface 600 could include buttons, dialog boxes, or other elements to allow a user to confirm that a selected portion of the record should be added to the summary or to provide some other functionality.

An indication of the selected portions could then be recorded into the summary. This could include copying text, images, or other information from the selected portion of the record to the summary. Additionally or alternatively, information indicative of the location of the selected portion within the record could be recorded. This could include an indication of an email or other element of the record that contains the selected portion, an offset, index, or other information about the location of the selected portion within the record, a length or other information about the size or duration of the selected portion, a universal resource locator or other indication of a location that the selected portion can be found, a timestamp, physical location, and/or user account associated with the selected portion, or some other information associated with the selected portion.

Additional information related to the selected portion could be recorded in the record. For example, a time that the portion was selected, an identity of a technician or other user that selected the selected portion, an identity of a laptop or other client device used to select the selected portion, a status of a related problem ticket when the portion was selected, or some other information related to the selection of the selected portion could be recorded. Annotation information could be recorded and associated with the selected portion within the summary. For example, a technician, when selecting the selected portion, could also generate explanatory notes or other annotation information about the selected portion.

The summary information can then be provided via a different graphical user interface to a client device, e.g., in response to receiving a request for such a summary from the client device. The client device could be the same device used to select the selected portions of the record that are represented in the summary. For example, a technician that has been working on a particular problem ticket could later, using the same laptop used to select the selected portion of the record, request the summary of the record in order to review their work to date and to plan future actions to resolve a problem ticket. Alternatively, a different client device could be used to access the summary. For example, a different technician could be assigned to the problem ticket in order to replace or supplement the original technician. The different technician, in order to review the current status of the problem ticket, could use their own laptop or other client device to access the summary.

In response to a request for the summary of the record, a depiction of a second graphical user interface that visually represents the summary of the record can be sent. Such a second graphical user interface could include elements that are representative of the different selected portions of the record. Alternatively, such a summary could include one or more elements corresponding to a technician-generated annotation without any underlying selected portion of the record.

Figure 7A:
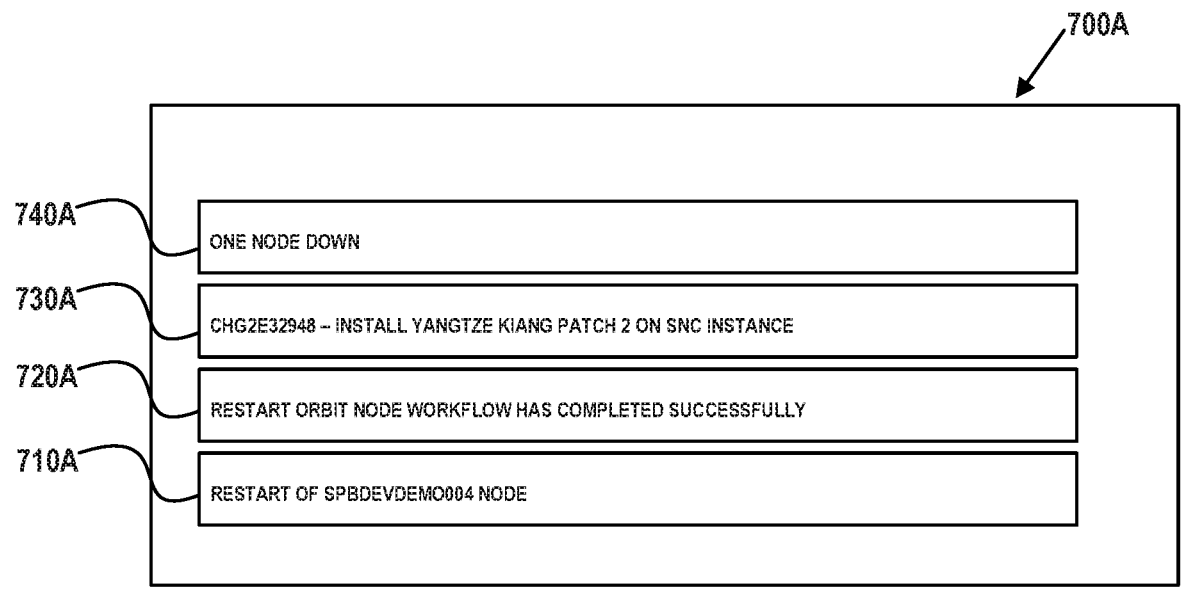
FIG. 7A depicts an example summary of the record depicted in FIG. 6.

FIG. 7A depicts such a graphical user interface 700A. The graphical user interface includes elements 710A, 720A, 730A, 740A that are representative of respective selected portions 610, 620, 630, 640 of the record selected using the first graphical user interface 600 depicted in FIG. 6. As shown in FIG. 7A, the graphical user interface 700A can include the selected text or other selected portions of the record. However, additional or alternative representations of the selected portions could be provided. For example, context information like the source of the selected portion (e.g., email, technician command, automated server status message), the time that the selected portion was generated, the time that the selected portion was selected, the identity of the technician or other user that selected the selected portion, or other information about the selected portion could be provided.

Figure 7B:
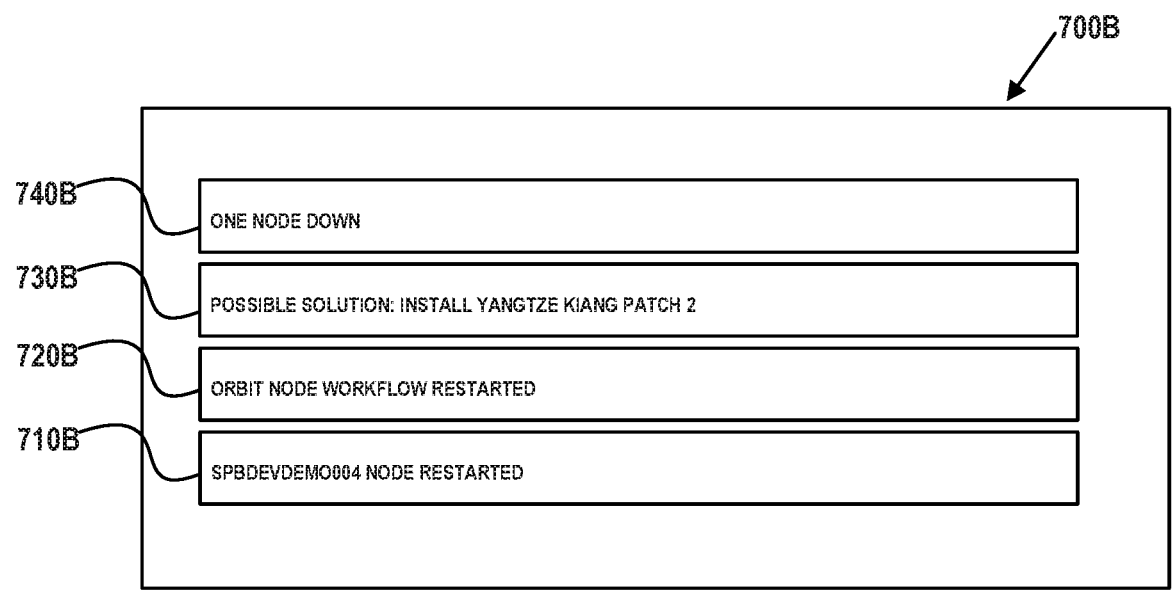
FIG. 7B depicts an example summary of the record depicted in FIG. 6.

For example, annotation information about a selected portion of the record could be provided in addition to or instead of the text or other contents of the selected portion. FIG. 7B depicts an example graphical user interface 700B. The graphical user interface 700B includes elements 710B, 720B, 730B, 740B that are representative of respective selected portions 610, 620, 630, 640 of the record selected using the first graphical user interface 600 depicted in FIG. 6. One of the elements (740B) depicts the text contained within a respective selected portion of the record. Other elements (710B, 720B, 730B) contain annotation information associated with respective selected portions of the record. Such annotation information could be generated by a technician or other user when the user originally selects the selected portion, via a summary graphical user interface (e.g., 700A, 700B), or via some other means and/or at some other time.

A graphical user interface that depicts a summary of a record could facilitate a variety of interactions with the summary. For example, such a graphical user interface could include buttons, text boxes, pop-up menus, right-click menus, or other elements to permit a user to add annotations to elements of the summary, to edit elements of the summary, to remove elements of the summary, or to otherwise update elements of the summary. The graphical user interface could include features to allow a user to adjust the ordering of elements of the summary, e.g., to cause the elements of the summary to be displayed in an order that deviates from a chronological order or from some other default ordering. For example, the graphical user interface could include up/down buttons to adjust the ordering of elements of the summary and/or the elements could be drag-able within the user interface. An indication of the ordering of elements of the summary could be recorded such that ordering is preserved during subsequent accesses of the summary.

The summary graphical user interface could include means for adding organizational information about the elements of the summary. This could include allowing a user to add information about the category of each element of the summary (e.g., user input/feedback, attempted fixes, failed fixes, partial resolutions, diagnostic information). The summary graphical interface could allow a user to group elements of the summary. For example, each symptom or other sub-aspect of a problem could have a corresponding group, and selected portions of text from the record could be assigned to the groups by a technician or other user. Such groups could be collapsible, allowing the summary itself to be simplified for review.

The summary graphical user interface could facilitate the removal of items from the summary. For example, a button, a pop-up menu item, a right-click menu item, or some other user interface element could be provided to allow a user to remove one or more items from a summary. In response to the user removing the item(s), an entry in the summary corresponding to the removed item(s) could be deleted and the corresponding portion of the case history could be un-highlighted. Alternatively, the entry could be flagged as removed. Such a flag could then be used to refrain from providing the removed entry as part of the summary during subsequent requests for the summary. Flagging the entry in this manner, rather than deleting the entry, can allow for later review of all of the portions of a record that were flagged, including those later removed. This could be helpful, e.g., in reviewing the progression of a problem ticket after the fact. Additionally, flagging allows erroneously removed summary elements to be restored. Information about removed summary elements could be accessed via the summary graphical user interface (e.g., by selecting a 'show removed items' checkbox), or via some other means (e.g., by using a database viewer to view the portion of a database that is representative of the summary).

The summary graphical user interface could provide additional functionality. For example, the summary graphical interface could allow a user to access additional information about an element of the summary. This could include selecting the element, using a button associated with the element, using a pop-up menu associated with the element, right-clicking on the elements, or otherwise interacting with the element or with a user interface element associated therewith. The additional information could include annotation information, information about a time that the summary element was generated (by selecting a portion of the underlying record) and/or that the underlying selected portion of the record was generated, a link to an email or other item related to the summary element, or some other information.

In some examples, interacting with an element of the summary could allow a user to navigate to the associated selected portion of the record. This could allow a technician to easily find the location within the record of the selected portion associated with the summary element in order to review the context of the selected portion of the record or to access some other information related to the selected portion. Navigating to the selected portion of the record could include providing a graphical user interface that depicts some or all of the underlying record, with the depicted portion of the record including the selected portion. The selected portion could be underlined, depicted in a different color, depicted as bolded or otherwise typographically modified, depicted against a colored background, or otherwise highlighted in order to assist a user in finding the selected portion of the record. The graphical user interface could be of the same type as the graphical user interface used to originally select the selected portion. Accordingly, the user could use the graphical user interface to select additional relevant portions of the record.

Figure 8:
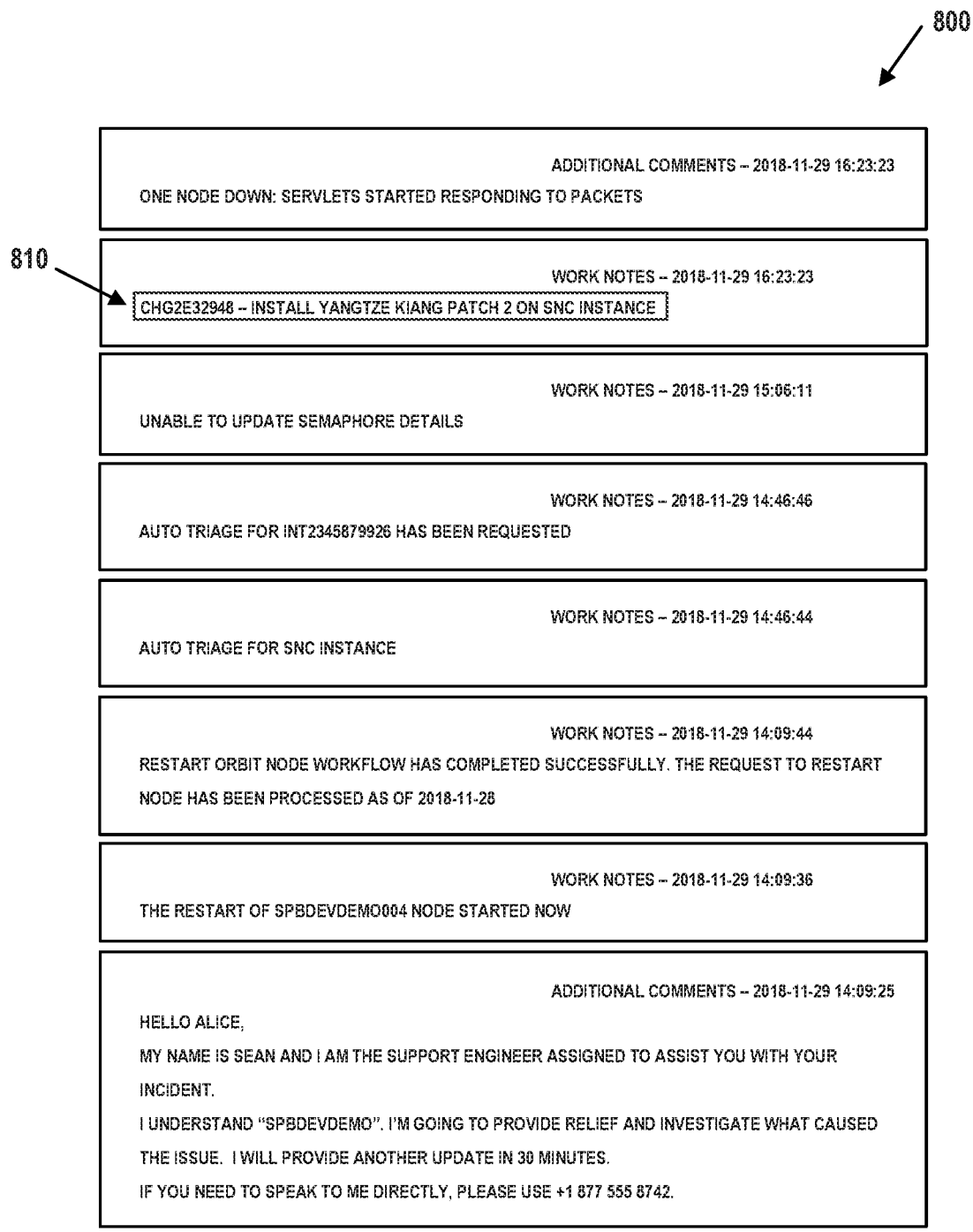
FIG. 8 depicts an example record.

An example of such a graphical user interface is depicted in FIG. 8. A user has selected a particular summary graphical user interface element 730A that is associated with a particular selected portion 630 of the record. In response to that selection, a graphical user interface 800 (which may be similar to graphical user interface 600) is provided that depicts the particular selected portion 630, as well as other portions of the record. The graphical user interface 800 includes highlighting 810 to indicate the particular selected portion 630 that is associated with the user's selection.

As shown in FIG. 8, highlighting can include providing a static box around the selected portion of the record. However, additional or alternative highlighting methods may be used. Text of the selected portion of the record could be depicted with a size, font, format, color, or other property selected to highlight the text. A box or other encircling mark, underlining, arrow, or other symbol or mark could be provided to highlight the selected portion of the record. A colored background could be provided to highlight the selected portion. The highlighting could be static or animated. Different colors, fonts, or other highlighting methods could be used to indicate contributions from respective different users.

Information about the selected portions of a record, as described above, could be used for a variety of additional purposes. In some examples, the selected portions could be used by a search algorithm to identify other relevant records in order to find possible solutions to a problem represented by the record. The selected portions could be used to categorize the record, to triage a problem ticket, to assign a problem ticket to a technician, or to perform some other action.

Information about selected portions of multiple records could be used to train an artificial neural network or some other algorithm to predict portions of a record that are likely to be selected by a technician or other user. Such portions are also likely to be relevant to the diagnosis or resolution of a problem represented by the record. In an example, a plurality of records (e.g., representing respective problem tickets generated for a managed network) could each contain one or more selected portions. The records, along with an indication of the selected portions thereof, could be used as training examples to train an artificial neural network, a set of work and/or paragraph vectors, or some other natural language processing algorithm to predict which portions of a novel record are likely to be selected by a user.

Such a trained algorithm could be applied to predict relevant portions of new or existing records. This could facilitate automated or semi-automated generation of summaries for such records. The portions selected by the algorithm could be automatically added to the summary for a record. Alternatively, a dialog box or other user interface process could be applied to suggest that a user add a selected portion to the summary and/or to allow the user to accept the selected portion into the summary. In some examples, the portions selected by the algorithm could be added to the summary with a flag indicating that they were generated by the algorithm. When providing a representation of a summary that includes such automatically-generated selected portions, the fact that the portions of the record were selected by the algorithm could be visually or otherwise depicted. A user could then manually accept the algorithm-selected portions. The indication and/or flag could then be removed from such accepted portions of the summary.

VI. EXAMPLE OPERATIONS

Figure 9:
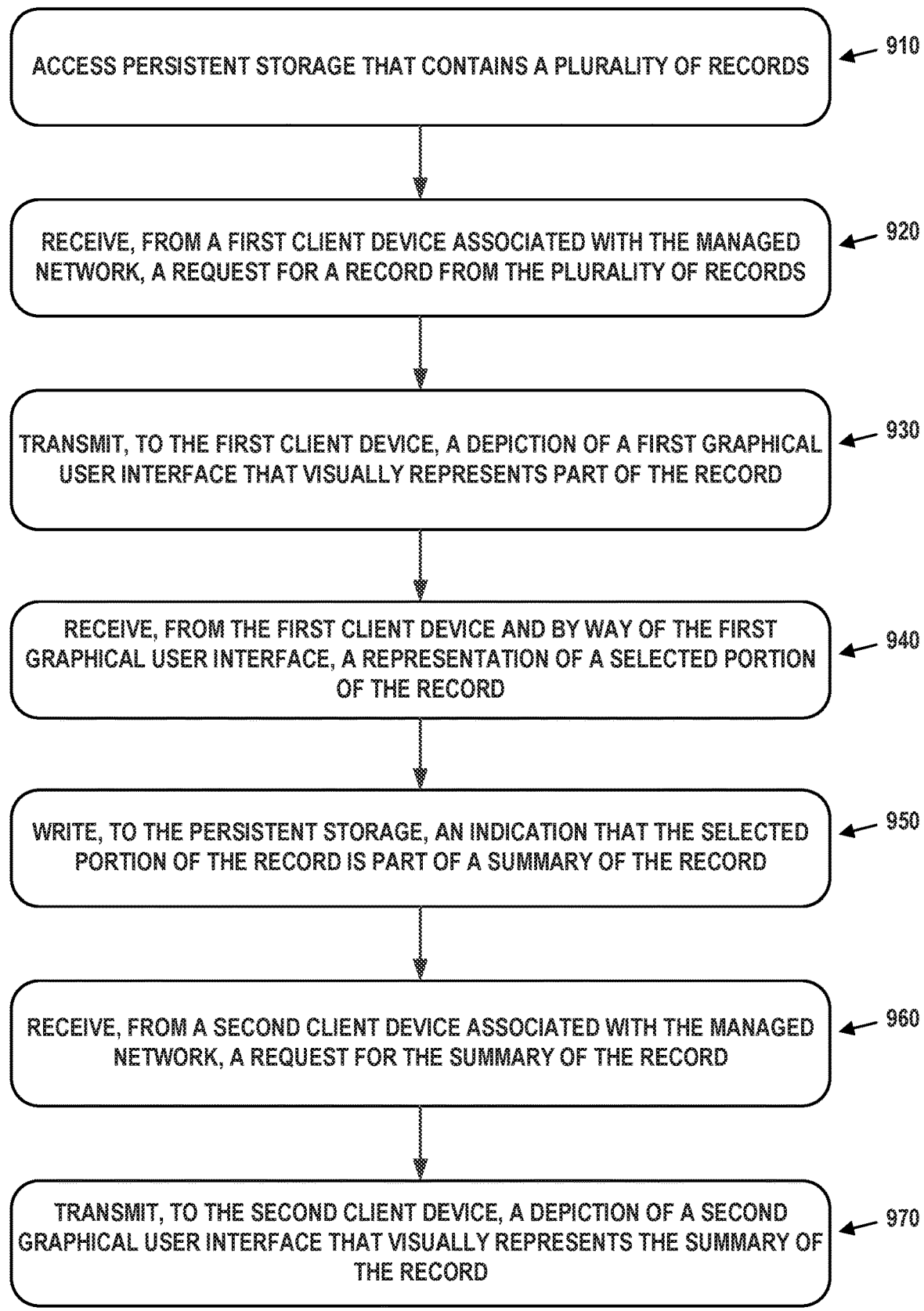
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

The example method of FIG. 9 includes accessing persistent storage that contains a plurality of records (910). Each of the records has multiple textual fields and relates to a managed network.

The example method of FIG. 9 additionally includes receiving, from a first client device associated with the managed network, a request for a record from the plurality of records (920). The example method of FIG. 9 additionally includes transmitting, to the first client device, a depiction of a first graphical user interface that visually represents part of the record (930). The example method of FIG. 9 additionally includes receiving, from the first client device and by way of the first graphical user interface, a representation of a selected portion of the record (940). The selected portion of the record includes text from the part of the record that was visually represented. The selected portion of the record could be selected by a user of the first client device highlighting the selected portion.

The example method of FIG. 9 additionally includes writing, to the persistent storage, an indication that the selected portion of the record is part of a summary of the record (950). This could include writing the text from the selected portion of the record to a textual field of the record. Additionally or alternatively, writing the indication that the selected portion of the record is part of the summary of the record comprises writing a reference to the part of the record that contains the selected portion of the record.

The example method of FIG. 9 additionally includes receiving, from a second client device associated with the managed network, a request for the summary of the record (960). The second client device could be the same device as the first client device or could be a different client device. The example method of FIG. 9 additionally includes transmitting, to the second client device, a depiction of a second graphical user interface that visually represents the summary of the record (970). The depiction of the second graphical user interface is representative of at least the selected portion.

The example method of FIG. 9 could include additional elements. For example, the example method of FIG. 9 could include receiving, by way of the second graphical user interface, a request for information about the selected portion and responsively transmitting, to the second client device, a depiction of a third graphical user interface (i) that visually represents a part of the record that includes the selected portion of the record, and (ii) that visually highlights the selected portion of the record. The example method of FIG. 9 could include receiving, by way of the first graphical user interface, annotation information for the selected portion and writing, to the persistent storage, the annotation information in a textual field of the record, and an indication that the annotation information is a further part of the summary of the record. In such examples, the summary of the record as represented on the second graphical user interface can include the annotation information. The example method of FIG. 9 could include receiving, by way of the second graphical user interface, a request to remove the selected portion from the summary of the record and responsively deleting, from the persistent storage, the indication that the selected portion of the record is part of the summary of the record.

The example method of FIG. 9 could include, based on a plurality of records and indications of at least one selected portion within each of the records, training a machine learning (ML) model to predict the selected portions of the records. Such a trained ML model could be applied to a further record to select a portion of the further record and an indication that the portion of the further record selected by the ML model is part of a summary of the further record could be written to the persistent storage. A depiction of a third graphical user interface that visually represents the summary of the further record could be transmitted to a third client device in response to receiving a request, from the third client device, for the summary of the further record.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A remote network management platform associated with a managed network and comprising:

persistent storage containing a plurality of records, wherein the plurality of records each have multiple textual fields and relate to the managed network, wherein each of the plurality of records comprises an information technology (IT) problem ticket, an IT problem report, communication between a user and a technician related to the IT problem ticket, one or more actions taken to resolve an IT problem, or notes generated by the technician regarding the IT problem ticket, or any combination thereof; and one or more processors configured to:

receive, from a first client device associated with the managed network, a request for a record from the plurality of records;

transmit, to the first client device, a depiction of a first graphical user interface that visually represents part of the record;

receive, from the first client device and by way of the first graphical user interface, a representation of a selected portion of the record, wherein the selected portion of the record includes text from the part of the record that was visually represented;

write, to the persistent storage, an indication that the selected portion of the record is part of a summary of the record and a location of the selected portion of the record within the record;

receive, from a second client device associated with the managed network, a request for the summary of the record; and transmit, to the second client device, a depiction of a second graphical user interface that visually represents the summary of the record, wherein the depiction of the second graphical user interface is representative of at least the selected portion.

2. The remote network management platform of claim 1, wherein the one or more processors are configured to:

receive, by way of the second graphical user interface, a request for information about the selected portion; and responsive to receiving the request for information about the selected portion, transmitting, to the second client device, a depiction of a third graphical user interface (i) that visually represents a part of the record that includes the selected portion of the record, and (ii) that visually highlights the selected portion of the record.

3. The remote network management platform of claim 1, wherein the one or more processors are configured to:

receive, by way of the first graphical user interface, annotation information for the selected portion; and write, to the persistent storage, the annotation information in a textual field of the record, and a second indication that the annotation information is a further part of the summary of the record, wherein the summary of the record as represented on the second graphical user interface includes the annotation information.

4. The remote network management platform of claim 1, wherein the one or more processors are configured to:

receive, by way of the second graphical user interface, a request to remove the selected portion from the summary of the record; and delete, from the persistent storage, the indication that the selected portion of the record is part of the summary of the record.

5. The remote network management platform of claim 1, wherein the persistent storage contains indications of at least one selected portion of each of the records, and wherein the one or more processors are configured to:

based on the records in the plurality of records and the indications of the at least one selected portion within each of the records, train a machine learning (ML) model to predict the selected portions of the records;

apply the trained ML model to a further record to select a portion of the further record;

write, to the persistent storage, a third indication that the portion of the further record selected by the ML model is part of a summary of the further record;

receive, from a third client device associated with the managed network, a request for the summary of the further record; and transmit, to the third client device, a depiction of a third graphical user interface that visually represents the summary of the further record, wherein the depiction of the third graphical user interface is representative of at least the selected portion of the further record.

6. The remote network management platform of claim 1, wherein writing the indication that the selected portion of the record is part of the summary of the record comprises writing the text from the selected portion of the record to a textual field of the record.

7. The remote network management platform of claim 1, wherein the location of the selected portion of the record within the record comprises a reference to the part of the record that contains the selected portion of the record.

8. The remote network management platform of claim 1, wherein the second client device is the first client device.

9. The remote network management platform of claim 1, wherein reception of the depiction of the first graphical user interface causes the first client device to display the part of the record, wherein the selected portion of the record was selected by a user of the first client device highlighting the selected portion.

10. A method comprising:

accessing persistent storage that contains a plurality of records, wherein the plurality of records each have multiple textual fields and relate to a managed network, wherein each of the plurality of records comprises an information technology (IT) problem ticket, an IT problem report, communication between a user and a technician related to the IT problem ticket, one or more actions taken to resolve an IT problem, or notes generated by the technician regarding the IT problem ticket, or any combination thereof;

receiving, from a first client device associated with the managed network, a request for a record from the plurality of records;

transmitting, to the first client device, a depiction of a first graphical user interface that visually represents part of the record;

receiving, from the first client device and by way of the first graphical user interface, a representation of a selected portion of the record, wherein the selected portion of the record includes text from the part of the record that was visually represented;

writing, to the persistent storage, an indication that the selected portion of the record is part of a summary of the record and a location of the selected portion of the record within the record;

receiving, from a second client device associated with the managed network, a request for the summary of the record; and transmitting, to the second client device, a depiction of a second graphical user interface that visually represents the summary of the record, wherein the depiction of the second graphical user interface is representative of at least the selected portion.

11. The method of claim 10, comprising:

receiving, by way of the second graphical user interface, a request for information about the selected portion; and responsive to receiving the request for information about the selected portion, transmitting, to the second client device, a depiction of a third graphical user interface (i) that visually represents a part of the record that includes the selected portion of the record, and (ii) that visually highlights the selected portion of the record.

12. The method of claim 10, comprising:

receiving, by way of the first graphical user interface, annotation information for the selected portion; and writing, to the persistent storage, the annotation information in a textual field of the record, and a second indication that the annotation information is a further part of the summary of the record, wherein the summary of the record as represented on the second graphical user interface includes the annotation information.

13. The method of claim 10, comprising:

receiving, by way of the second graphical user interface, a request to remove the selected portion from the summary of the record; and deleting, from the persistent storage, the indication that the selected portion of the record is part of the summary of the record.

14. The method of claim 10, wherein the persistent storage contains indications of at least one selected portion of each of the records, and wherein the method comprises:
based on the records in the plurality of records and the indications of the at least one selected portion within each of the records, training a machine learning (ML) model to predict the selected portions of the records;
applying the trained ML model to a further record to select a portion of the further record;
writing, to the persistent storage, a third indication that the portion of the further record selected by the ML model is part of a summary of the further record;
receiving, from a third client device associated with the managed network, a request for the summary of the further record; and
transmitting, to the third client device, a depiction of a third graphical user interface that visually represents the summary of the further record, wherein the depiction of the third graphical user interface is representative of at least the selected portion of the further record.

15. The method of claim 10, wherein writing the indication that the selected portion of the record is part of the summary of the record comprises writing the text from the selected portion of the record to a textual field of the record.

16. The method of claim 10, wherein the location of the selected portion of the record within the record comprises a reference to the part of the record that contains the selected portion of the record.

17. The method of claim 10, wherein the second client device is the first client device.

18. The method of claim 10, wherein reception of the depiction of the first graphical user interface causes the first client device to display the part of the record, wherein the selected portion of the record was selected by a user of the first client device highlighting the selected portion.

19. An article of manufacture including a non-transitory computer-readable medium, having stored thereon program instructions that, upon execution by one or more processors, cause the one or more processors to perform operations comprising:
accessing persistent storage that contains a plurality of records, wherein the plurality of records each have multiple textual fields and relate to a managed network, wherein each of the plurality of records comprises an information technology (IT) problem ticket, an IT problem report, communication between a user and a technician related to the IT problem ticket, one or more actions taken to resolve an IT problem, or notes generated by the technician regarding the IT problem ticket, or any combination thereof;
receiving, from a first client device associated with the managed network, a request for a record from the plurality of records;
transmitting, to the first client device, a depiction of a first graphical user interface that visually represents part of the record;
receiving, from the first client device and by way of the first graphical user interface, a representation of a selected portion of the record, wherein the selected portion of the record includes text from the part of the record that was visually represented;
writing, to the persistent storage, an indication that the selected portion of the record is part of a summary of the record and a location of the selected portion of the record within the record;
receiving, from a second client device associated with the managed network, a request for the summary of the record; and
transmitting, to the second client device, a depiction of a second graphical user interface that visually represents the summary of the record, wherein the depiction of the second graphical user interface is representative of at least the selected portion.

20. The article of manufacture of claim 19, wherein the operations comprise:
receiving, by way of the second graphical user interface, a request for information about the selected portion; and
responsive to receiving the request for information about the selected portion, transmitting, to the second client device, a depiction of a third graphical user interface (i) that visually represents a part of the record that includes the selected portion of the record, and (ii) that visually highlights the selected portion of the record.

* * * * *